United States Patent [19]

Martin

[11] B 4,015,048

[45] Mar. 29, 1977

[54] CERAMIC ARTICLES HAVING CORDIERITE COATINGS

[75] Inventor: Francis W. Martin, Painted Post, N.Y.

[73] Assignee: Corning Glass Works, Corning, N.Y.

[22] Filed: Mar. 3, 1975

[21] Appl. No.: 554,655

[44] Published under the second Trial Voluntary Protest Program on February 24, 1976 as document No. B 554,655.

[52] U.S. Cl. .................................. 428/428; 65/33; 106/39.6; 106/52; 106/53; 106/48; 106/49

[51] Int. Cl.² ..................... C03C 3/22; C03C 12/00

[58] Field of Search ............ 428/428; 106/39.6, 48, 106/49, 52, 53

[56] References Cited

UNITED STATES PATENTS

| | | | |
|---|---|---|---|
| 3,024,303 | 3/1962 | Smothers et al. | 427/95 X |
| 3,084,053 | 4/1963 | Arlett et al. | 106/39.6 X |
| 3,275,493 | 9/1966 | MacDowell | 106/39.6 |
| 3,450,546 | 6/1969 | Stong | 106/39.6 |
| 3,673,049 | 6/1972 | Giffen et al. | 428/428 |
| 3,883,337 | 5/1975 | Hengesson et al. | 65/33 X |

OTHER PUBLICATIONS

Karkhanavala, M. D. et al. – "The Polymorphism of Cordierite" J. Am. Cer. Soc. 36(12) pp. 389–392.
MacMillan, P. W. – *Glass–Ceramics* (1964) Academic Press New York – pp. 116–117, 134, 164–165.

*Primary Examiner*—Helen M. McCarthy
*Attorney, Agent, or Firm*—Kees van der Sterre; Clinton S. Janes, Jr.; Clarence R. Patty, Jr.

[57] ABSTRACT

Sinterable powdered glasses comprising MgO, $Al_2O_3$, $SiO_2$ and at least one modifying oxide selected from the group consisting of BaO, PbO, SrO and CaO, which are thermally-crystallizable at sintering temperatures to yield highly crystalline, low expansion, thermally stable glass-ceramic coatings comprising crystals of a structure corresponding to hexagonal cordierite as the crystal phase, are described. The use of the glasses to provide crystallized electrical barrier layers on glass-ceramic articles is also described.

10 Claims, No Drawings

CERAMIC ARTICLES HAVING CORDIERITE COATINGS

Cordierite ($2MgO.2Al_2O_3.5SiO_2$) is a crystalline material demonstrating relatively high refractoriness, having a melting point of 1460°C., and in a pure form, excellent electrical insulating properties and a relatively low coefficient of thermal expansion over the range up to 1000°C.

Non-porous void-free glass-ceramic articles comprising cordierite as the principal crystal phase have been provided by conventional processes involving the thermal crystallization of preformed glass articles. However there are many products such as coatings, seals, articles of complex configuration, and the like which cannot be provided by conventional glass-forming processes, and which therefore require sinterable glass powders to provide the required shapes.

Unfortunately, the sinterability of glass powders having the stoichiometry of pure cordierite is very poor. This is illustrated by the fact that the forming of powdered glasses of the cordierite composition into bars which are then fired at temperatures up to 1200°C. results in porous, granular, mechanically weak ceramic bodies. The poor sinterability of glasses of cordierite composition is presently attributed to the fact that a magnesia beta-quartz crystal phase forms in the glass at temperatures in the glass sintering range and at an early stage in the sintering process. This phase rapidly increases the effective viscosity of the glass and substantially reduces the extent of glassy phase sintering.

These problems were alleviated in accordance with prior art practice by the use of brief sintering treatments at temperatures in the sintering range, followed by prolonged treatments at high temperatures to produce consolidation of the sintered glass and crystallization to cordierite. Thus U.S. Pat. No. 3,450,546 describes the manufacture of transparent cordierite glass-ceramics from glass powders utilizing brief sintering treatments followed by consolidation-crystallization treatments at temperatures in the 1200°-1425°C. range.

It will be appreciated that the severity of such consolidation and crystallization treatments were a factor limiting the utility of cordierite compositions for use in the preparation of coatings, seals and complex articles in the prior art. Particularly where coatings and seals were required, the limited high temperature durability of substrate materials appeared to limit the suitability of cordierite-related compositions for such applications.

Recently it was discovered that the sintering capability of cordierite glasses could be improved by the addition of minor quantities (0.3-1.5 mole percent) of $Cs_2O$ and/or $K_2O$ to glasses near the cordierite stoichiometry. Hence U.S. Pat. application Ser. No. 477,197, filed June 7, 1974 and commonly assigned herewith, describes the manufacture of dense sintered glass-ceramic articles comprising minor quantities of these oxides. However, the presence of alkali metal constituents in these compositions raised questions concerning the electrical properties thereof.

I have now discovered that glassy-phase sintering in cordierite-related glasses may be improved through the addition of controlled amounts of PbO, BaO, SrO and/or CaO modifying oxides to $MgO-Al_2O_3-SiO_2$ base glasses of specified composition. Provided that the components of these glasses are present in the proportions hereinafter set forth, the glass powders produced therefrom exhibit an unexpected combination of improved glassy phase sintering, complete crystallization to cordierite at sintering temperatures, excellent refractoriness and thermal stability due to the absence of residual glassy phases in the product, low thermal expansion and porosity in the product, and excellent high temperature resistivity and dielectric strength.

Minor quantities of the above-described modifying oxides have been added to $MgO-Al_2O_3-SiO_2$ glasses in the prior art, principally to improve the melting characteristics thereof but also in the course of attempts to improve sintering behavior. However the addition of more substantial quantities has generally been avoided because it was expected that major fourth component additions would increase the amount of residual glass in the crystallized cordierite product, thus increasing the thermal expansion and reducing the refractoriness and thermal stability thereof. The prior art utilization of increased quantities of silica (over that stoichiometrically required for cordierite formation) is also undesirable for these reasons.

In accordance with the present invention, the successful utilization of PbO, BaO, SrO and CaO to provide sinterable yet refractory cordierite-related glass-ceramics is based on the discovery that these oxides may, under proper conditions, be incorporated into the hexagonal cordierite crystal structure. This is accomplished through the adjustment of the proportions of the MgO, $Al_2O_3$ and $SiO_2$ base constituents to maintain crystal charge balance in the presence of these modifying oxides, thus permitting the production of a highly crystalline product which is essentially free of residual glassy phases and hence thermally stable and low in thermal expansion. Excellent high temperature resistivities are also observed.

The hexagonal cordierite structure has a rather low density due to large channels running along the c-axis of the crystal. This channel is alternately constricted at the ring sites but is quite large in between. It is ample in size to accomodate even a large alkaline earth metal ion such as $Ba^{+2}$.

Evidence that the modifying metal ions do in fact enter the hexagonal cordierite structure is provided by X-ray diffraction data showing that, while the modified crystals retain a structure corresponding to hexagonal cordierite, the intensities of certain diffraction lines are altered by the presence of the modifying ions. For example, reflections from the 200 and 210 crystal planes, which are quite weak in normal hexagonal cordierite, are intensified, whereas reflections from 100, 110, 002, 102 and 212 crystal planes are suppressed.

Rather large additions of modifying metal oxides can be made to cordierite compositions, while avoiding the presence of glassy phases and thus retaining a high degree of crystallinity, if stoichiometric relations are observed. The unit cell of hexagonal cordierite contains 10 $Si^{+4}$ atoms for every 8 $Al^{+3}$ atoms and 4 $Mg^{+2}$ atoms. If for each doubly-charged modifying metal ion introduced into the cell, charge balance is maintained by also introducing two aluminum atoms in substitution for two silicon atoms, the hexagonal cordierite crystal structure is preserved despite the presence of the modifying metal ion in the cell channel. Observing these relationships, up to one doubly-charged modifying metal ion per unit cell may be introduced into crystalline hexagonal cordierite without disrupting the crystal structure. Preservation of this structure avoids the formation of major non-cordierite crystalline phases or glassy phases in the crystallized glass-ceramic product.

Based on these limitations, crystals of a structure corresponding to hexagonal cordierite, but having a molar composition of about:

$$4MgO.5Al_2O_3.8SiO_2.1MO$$

wherein the modifying metal oxide MO, selected as hereinabove described, comprises not more than about 5.6 mole percent of the composition, may be provided in some of the more highly substituted cordierite compositions. Larger proportions of modifying oxides are not preferred because the increased quantities of alumina required for stoichiometry lead to melting and forming difficulties and also because such compositions tend to crystallize to phases other than hexagonal cordierite.

There is some evidence that magnesium ions are also cappable of substitution into the cordierite crystal lattice in the manner of the modifying metal ions above described. Thus quantities of magnesium oxide in excess of those stoichiometrically required for the formation of cordierite may be employed without deleteriously affecting the crystallinity of the product. Also, the use of excess magnesium oxide improves the sintering behavior of the glass and permits the use of reduced quantities of modifying oxides.

Sinterable powdered glasses within the scope of the present invention include compositions consisting essentially, on the oxide basis, of about 22.2–26 mole percent MgO, 23.6–27.8 mole percent $Al_2O_3$, 44.3–52.7 mole percent $SiO_2$, 0.7–5.6 mole percent total of one or more modifying oxides selected from the group consisting of BaO, PbO, SrO and CaO, and at least about 23.6 mole percent total of modifying oxides plus MgO. Glassy phases in the crystallized glass-ceramic product are minimized by increasing the alumina content of the composition in approximate correspondence with modifying oxide additions, to approach stoichiometry. Thus the $Al_2O_3$ content of the composition is maintained at a level which exceeds the total modifying oxide content by at least 21 but not more than about 23 mole percent.

Compositions containing less than about 23.6 mole percent total of modifying oxides plus MgO do not exhibit the required sintering behavior, whereas compositions containing less than 23.6 mole percent $Al_2O_3$ or more than 52.7 mole percent $SiO_2$ do not exhibit the required crystallinity, refractoriness and thermal stability. Better sintering and thermal properties are exhibited by compositions containing 1.4–5.6 mole percent total of modifying oxides.

Glasses within the above described composition range can be prepared by melting batches composed of conventional glass batch ingredients at temperatures in the range of about 1600°–1800°C. in accordance with conventional practice. The batch ingredients may comprise any constituents, whether oxides or other compounds, which will be converted to the desired oxides in the proper proportions at the temperatures utilized for melting the batch.

The glass products may be converted into useful powdered glasses utilizing any of the known fritting and/or grinding methods. For the purpose of the present description a powdered glass is a comminuted glass product wherein the glass particles do not exceed about 100 mesh, U.S. Standard Sieve, (150 microns) in size. Finer powders, having maximum particle sizes in the range of about 4–40 microns, are preferred. However any of these powders provide the desirable advantages of improved glassy phase sintering, permitting the production of a consolidated, highly crystalline product. Of course, granular glass materials of larger particle size can also be sintered and crystallized, but the production of a dense, void-free product therefrom is difficult.

The sintering and crystallization of glass powders provided in accordance with the present invention is accomplished by heating at temperatures in the range of about 900°–1050°C. for times in the range of about ¼–12 hours. Normally, complete crystallization to crystals of hexagonal cordierite structure is achieved within this time interval, particularly where firing temperatures of 950°C. or above are employed. However, the crystalline products are quite stable in this temperature range, so that even longer heating, while normally of no particular benefit, may be utilized if desired. Linear shrinkages on sintering exceed 3 percent and normally are in the range of 5–18 percent for these compositions.

For the purposes of the present description the product of the crystallization process is referred to as a sintered glass-ceramic product, inasmuch as it normally results from the heterogeneous crystallization of the glass after sintering has been initiated. The glass-ceramic product is typically highly crystalline, having a linear coefficient of thermal expansion not exceeding about $20 \times 10^{-7}$/°C. over the temperature range up to about 1000°C. It may be in the form of a sintered glass-ceramic article, coating, seal or other useful configuration. The sole crystal phase consists of silicate crystals of a structure corresponding to hexagonal cordierite, this crystal phase comprising the oxides of magnesium, aluminum, silicon, and the modifying ions in the approximate molar proportions:

$$4MgO.(4+n)Al_2O_3.(10-2n)SiO_2.(n)MO$$

wherein MO is one or more modifying oxides selected from the group consisting of PbO, BaO, SrO and CaO, and wherein $n$ preferably ranges from 0.25–1.

The glass-ceramic products of the present invention are particularly useful in the form of coatings on ceramic, glass-ceramic or glass articles to modify the physical properties thereof. Through the process of sintering and crystallization of the powdered glass, integral crystalline coatings of low porosity exhibiting excellent refractoriness, good thermal stability, low thermal expansion, high dielectric strength, high electrical resistivity, and other properties desirable in a ceramic coating may be provided. Accordingly, the invention further comprises a ceramic article having on at least a portion of the surface thereof a sintered, crystallized coating having a composition and structure such as hereinabove described. The ceramic article supporting the coating may be a conventional ceramic article, a glass-ceramic article, or a refractory glass such as a high-silica glass. Also included within the scope of the invention is a method for improving the physical properties, particularly the electrical properties, of ceramic and especially glass-ceramic articles by applying the disclosed glass powders thereto followed by sintering and crystallization thereof. The utility of powdered glasses produced in accordance with the present invention for coating and sealing applications resides in the fact that they provide a high degree of sinterability, yet crystallize fully to the hexagonal cordierite structure at moderate temperatures (900°–1050°C.) in the sintering range of the glass.

Moreover, the products of crystallization are essentially free of residual glass and secondary crystal phases such as magnesia quartz, sapphirine, celsian and the like which do not advantageously affect the thermal expansion, stability, and electrical properties thereof. Powdered glasses providing the most desirable combination of properties are those within the above-described composition region wherein the modifying oxides include at least about 1.4 mole percent total of oxides selected from the group consisting of BaO and PbO.

The above combination of properties is critical in obtaining useful improvements in electrical properties in ceramic articles provided with cordierite coatings in accordance with the invention. For example, lithium aluminosilicate ceramics and glass-ceramics comprising a principle crystal phase composed of beta-spodumene solid solution typically provide an excellent combination of mechanical and thermal properties, including low thermal expansion, high thermal stability and good strength. However, the electrical resistivity of these materials, particularly at elevated temperatures, is rather low compared to some other ceramic compositions.

The application of a cordierite glass-ceramic coating to such lithium aluminosilicate ceramic or glass-ceramic articles by the process of applying a powdered sinterable glass thereto and firing to sinter and crystallize the glass to provide the coating substantially improves the high temperature electrical resistivity of the articles. Moreover, the excellent sinterability of the oxide-modified cordierite glasses of the invention provides a glass-ceramic coating of low porosity which exhibits substantially higher dielectric strength than would porous crystalline coatings applied by prior art methods. And finally, the capability of obtaining a fully-crystallized coating at moderate firing temperatures can be critical in avoiding deformation or change to the glass-ceramic substrate during the coating process. A lithium aluminosilicate glass-ceramic article having on at least a portion of the surface thereof an insulating electrical barrier layer composed of a sintered glass-ceramic material such as described thus constitutes a particularly preferred embodiment of the present invention.

Table I below sets forth examples of sinterable crystallizable glass compositions within the scope of the present invention, wherein the proportions of constituents are expressed in approximate mole percent on the oxide basis. Glasses of the recited compositions may be provided by combining suitable proportions of conventional batch ingredients and melting the batch at temperatures in the 1600°–1800°C. range within an interval of about 16 hours in accordance with conventional practice. The batch may comprise conventional glass batch constituents which are converted to the specified oxide composition components at the temperatures utilized for melting the batch.

The glass batches thus prepared may be converted into powdered glasses by casting into slabs and grinding the slabs into powder, or by pouring as thin streams into water to provide a glass frit which is thereafter ground to a usefully small maximum particle size.

TABLE 1

|  | 1 | 2 | 3 | 4 | 5 | 6 | 7 |
|---|---|---|---|---|---|---|---|
| MgO | 22.2 | 22.2 | 22.2 | 25.0 | 22.2 | 22.2 | 22.4 |
| $Al_2O_3$ | 27.8 | 25.0 | 27.8 | 25.4 | 26.4 | 25.0 | 24.9 |
| $SiO_2$ | 44.4 | 50.0 | 44.4 | 48.2 | 47.2 | 50.0 | 49.9 |
| CaO |  |  |  |  | 4.2 |  | 0.9 |
| PbO | 5.6 | 2.8 |  |  |  |  | 0.9 |
| BaO |  |  | 5.6 | 1.4 |  |  | 0.9 |
| SrO |  |  |  |  |  | 2.8 |  |

The calculated weight percent compositions of the examples set forth in Table I are set forth in Table IA below:

TABLE IA

|  | 1 | 2 | 3 | 4 | 5 | 6 | 7 |
|---|---|---|---|---|---|---|---|
| MgO | 11.7 | 12.7 | 12.3 | 15.0 | 13.4 | 13.3 | 13.3 |
| $Al_2O_3$ | 37.0 | 36.0 | 39.1 | 38.6 | 40.5 | 37.8 | 37.2 |
| $SiO_2$ | 34.9 | 42.5 | 36.8 | 43.2 | 42.6 | 44.6 | 43.9 |
| CaO |  |  |  |  | 3.5 |  | 0.7 |
| PbO | 16.4 | 8.8 |  |  |  |  | 2.9 |
| BaO |  | 11.8 | 3.2 |  |  | 2.0 |  |
| SrO |  |  |  |  |  | 4.3 |  |

Powdered glasses having compositions such as set forth in Table I and Table IA are sinterable and crystallizable at temperatures in the 900°–1050°C. range to provide integral glass-ceramic articles or coatings which are very highly crystalline, comprising essentially no residual glass. In the preferred sintering and crystallization range of 950°–1000°C., full crystallization can normally be achieved within a time interval of about ½–4 hours.

The invention may be further understood by reference to the following illustrative examples showing the preparation of glass-ceramic articles and coatings within the scope of the invention and some of the properties thereof.

EXAMPLE I

A batch for a glass having a composition, on the oxide basis, of about 22.3 mole percent MgO, 25.0 mole percent $Al_2O_3$, 49.9 mole percent $SiO_2$, and 2.8 mole percent PbO is compounded, ball-milled, and melted at 1650°C. in a platinum crucible over a period of 7 hours. The glass melt is then cast into a glass slab and annealed at 700°C.

The glass slab is crushed and ground to provide a glass powder having a maximum particle size of about 150 microns (passing 100 mesh). This powder is then pressed into a cylindrical sample about 0.5 inches in diameter and 0.5 inches in height.

The pressed cylinder is then heated to a temperature of 950°C. and maintained at that temperature for ½ hour to sinter and crystallize the powdered glass into a highly-crystalline glass-ceramic cylindrical sample. A linear shrinkage on firing of about 5.5 percent which is indicative of good sintering is observed.

The sample is then subjected to high temperature electrical resistivity measurements to determine the D.C. volume resistivity thereof at temperatures in the range of about 400°–825°C. the following log resistivity ($\rho$) values (ohm-centimeters), are recorded:

| TEMPERATURE | LOG $\rho$ (ohm-centimeters) |
|---|---|
| 425°C. | 12.93 |
| 500°C. | 11.64 |
| 625°C. | 10.42 |
| 712°C. | 9.39 |

| TEMPERATURE | LOG ρ (ohm-centimeters) |
|---|---|
| 825°C. | 8.37 |

X-ray diffraction examination of the sample shows a high degree of crystallization to crystals corresponding in structure to hexagonal cordierite, but with the presence of lead being reflected by altered line intensities.

EXAMPLE II

A batch for a glass having a composition, on the oxide basis, of about 22.4 mole percent MgO, 24.9 mole percent $Al_2O_3$, 49.9 mole percent $SiO_2$, and 2.7 mole percent BaO is compounded, ball-milled, melted, cast into a slab, annealed, crushed, and ground to provide a glass powder as in Example I above.

The glass powder, having a maximum particle size of about 150 microns (passing 100 mesh), is pressed into a cylindrical sample according to the procedure of Example I and is then heated to 950°C. for ½ hour to sinter and crystallize the sample. A linear shrinkage on firing of about 13.4 percent which is indicative of good sintering is observed.

The sintered crystallized sample is subjected to high temperature electrical resistivity measurements in the temperature range of about 400°–500°C., with the following results:

| TEMPERATURE | LOG ρ (ohm-centimeters) |
|---|---|
| 405°C. | 13.42 |
| 450°C. | 12.85 |
| 476°C. | 12.57 |

X-ray diffraction examination of the sample shows a high degree of crystallization to crystals corresponding in structure to hexagonal cordierite, with the intensities of some diffraction lines being altered due to the presence of barium.

EXAMPLE III

A batch for a glass having a composition, on the oxide basis, of about 22.4 mole percent MgO, 24.9 mole percent $Al_2O_3$, 49.9 mole percent $SiO_2$, 0.9 mole percent BaO, 0.9 mole percent PbO, and 0.9 mole percent CaO is compounded, ball-milled, melted, cast into a slab, annealed, crushed, and ground to provide a glass powder as in Examples I and II above.

The glass powder, having a maximum particle size of about 150 microns (passing 100 mesh) is pressed into a cylindrical sample as in Examples I and II above and heated to 950°C., for ½ hour to sinter and crystallize the sample. A linear shrinkage of about 8.7 percent on firing which is indicative of good sintering is observed.

The sintered crystallized sample is subjected to high temperature electrical resistivity measurements as in Examples I and II above, with the following results:

| TEMPERATURE | LOG ρ (ohm-centimeters) |
|---|---|
| 355°C. | 13.61 |
| 405°C. | 13.25 |
| 450°C. | 12.63 |
| 476°C. | 12.10 |

X-ray diffraction examination of the sample shows a high degree of crystallization to crystals corresponding in structure to hexagonal cordierite, with some modified line intensities which are attributed to the presence of lead, barium and calcium.

In the preparation of coatings, seals, or other glass-ceramic products from glass powders provided in accordance with the invention, the particles of glass may be utilized in combination with any of the known binders, forming aids or other means utilized in the prior art to obtain a green (unfired) product. Also, any of the prior art coating or forming methods may be used to provide the desired green configuration. Where a seal or compacted article is of a thickness such that specific attention to the removal of the binder of forming aid is required, heating of the compacted glass at temperatures above the binder decomposition or volatilization temperature, but below the sintering temperature of the glass, e.g., 500°–800°C., may be utilized to achieve the desired removal. However, no specific removal procedure is normally required for thin coatings.

The utility of coatings produced in accordance with the invention to enhance the electrical properties of ceramic articles to which they are applied can be demonstrated by electrical leakage and dielectric strength testing of coated and uncoated articles.

A pair of glass-ceramic plates A and B of comparable thickness, each composed of a lithium aluminosilicate glass-ceramic material comprising a beta-spodumene solid solution as the principal crystal phase, are selected for testing.

Plate A is provided with a cordierite-containing coating produced by sintering and crystallization of a powdered glass in accordance with the present invention. A glass powder having an average particle size of about 8 microns and an oxide composition of about 22.4 mole percent MgO, 23.6 mole percent $Al_2O_3$, 52.7 mole percent $SiO_2$, and 1.4 mole percent PbO is mixed with a suitable oil vehicle to provide a paste. Part of this paste is then applied as a coating to a protion of one surface of one of the glass-ceramic plates, utilizing a doctor blade to adjust the thickness of the green coating to about 15 mils.

Coated plate A is then heated to a temperature of about 950°C., maintained at that temperature for about 1 hour to sinter the powdered glass to an integral coating and crystallize the coating, and finally cooled to room temperature. A second paste coating is then applied over the first coating and fired according to the same procedure. The final crystallized cordierite coating is about 16 mils in thickness.

An electrical heating element consisting of a thin noble metal film is then applied to the cordierite-coated surface portion of glass-ceramic plate A, utilizing an organometallic solution to apply the element by silk screening in accordance with conventional methods.

An element of similar composition, size, and configuration is also applied for comparative testing to one surface of uncoated beta-spodumene glass-ceramic plate B. This unit comprising plate B and a heating element is hereinafter referred to as Unit B, whereas plate A with the cordierite coating and element is referred to as Unit A.

The two units prepared as above described are then subjected to electrical leakage testing. Unit A comprising the cordierite coating and element is first heated by applying an AC voltage to the element. When the unit reaches an operating temperature of above 500°C., a sheet of metal foil is pressed against the surface of the plate opposite the heating element, and the voltage is adjusted to apply 120 volts between the element and the foil. Means are provided for measuring the leakage current flowing between the element and foil through the plate and cordierite coating.

Leakage currents of only about 0.04 milliamperes are quite typical of units having the configuration of Unit A, when operated under thermal and electrical conditions such as above described. In contrast, units having a configuration such as that of Unit B, when similarly tested, typically generage leakage currents on the order of 75 milliamperes under equivalent operating conditions.

Dielectric strength testing of Units A and B also show the significant advantages provided by cordierite barrier layers provided in accordance with the invention. For this test, an AC voltage is applied to the heating element of Unit A to heat the unit to a temperature above about 500°C. A sheet of metal foil is then positioned against the surface of the glass-ceramic plate opposite the cordierite coating and heating element, and a separate AC voltage is applied between the element and foil. This voltage is gradually increased to a final value of 1000 volts and maintained for about one minute. Thereafter the unit is disconnected from the voltage sources and cooled. No dielectric breakdown occurs.

In contrast to the above results, when units of a configuration corresponding to Unit B, comprising only a beta-spodumene plate and a noble metal heating element without any barrier layer, are subjected to this program of dielectric testing, catastrophic dielectric breakdown characterized by arcing or melting through the glass-ceramic plate typically occurs well before the maximum 1000 volt potential is reached.

It is possible to employ barrier coatings composed of flame-sprayed alumina, silica-bonded fibrous aluminosilicates, or other refractory insulating materials to obtain useful reductions in electrical leakage in simple heating units such as Unit B described above. However, such coatings exhibit substantially greater porosity than sintered crystalline cordierite coatings produced according to the present invention. Hence, because of the presence of voids or air passages in such coatings, the dielectric strength demonstrated thereby would be substantially less than is obtainable utilizing barrier layers composed of sintered crystalline cordierites such as hereinabove described. Hence the cordierite glass-ceramic coatings of the invention provide electrical insulating properties which are considerably better than prior art insulating coatings.

I claim:

1. A ceramic article having on at least a portion of the surface thereof a non-porous sintered cordierite glass-ceramic coating, wherein
    a. said coating has an oxide composition consisting essentially, in mole percent, of about 22.2–26 mole percent MgO, 23.6–27.8 mole percent $Al_2O_3$, 44.3–52.7 mole percent $SiO_2$, 0.7–5.6 mole percent MO, wherein MO is one or more modifying oxides selected from the group consisting of BaO, PbO, SrO and CaO, and at least 23.6 mole percent total of (MO + MgO), said $Al_2O_3$ being present in an amount which exceeds the amount of said modifying oxides by about 21–23 mole percent,
    b. said coating contains crystals of a structure corresponding to hexagonal cordierite as the sole crystal phase, being essentially free of residual glass and the secondary crystal phases magnesia quartz, sapphirine and celsian; and
    c. said coating is provided by heating a glass powder coating having said oxide composition at a temperature in the range of about 900°–1050°C. for a time sufficient to obtain the sintering and crystallization thereof.

2. A ceramic article in accordance with claim 1 wherein the oxide composition includes 1.4–5.6 mole percent total of oxides selected from the group consisting of BaO, PbO, SrO and CaO.

3. A ceramic article in accordance with claim 2 wherein the oxide composition includes at least about 1.4 mole percent total of oxides selected from the group consisting of BaO and PbO.

4. A ceramic article in accordance with claim 1 wherein the cordierite coating has an average linear coefficient of thermal expansion not exceeding about $20 \times 10^{-7}$/°C. over the temperature range 25°–1000°C.

5. A glass-ceramic article having on at least a portion of the surface thereof a nonporous, sintered cordierite glass-ceramic coating, wherein
    a. said coating has an oxide composition consisting essentially in mole percent, of about 22.2–26 mole percent MgO, 23.6–27.8 mole percent $Al_2O_3$, 44.3–52.7 mole percent $SiO_2$, 0.7–5.6 mole percent MO, wherein MO is one or more modifying oxides selected from the group consisting of BaO, PbO, SrO, and CaO, and at least 23.6 mole percent total of (MO + MgO), said $Al_2O_3$ being present in an amount which exceeds the amount of said modifying oxides by about 21–23 mole percent,
    b. said coating contains crystals of a structure corresponding to hexagonal cordierite as the sole crystal phase, being essentially free of residual glass and the secondary crystal phases magnesia quartz, sapphirine and celsian; and
    c. said coating is provided by heating a glass powder coating having said oxide composition at a temperature in the range of about 900°–1050°C. for a time sufficient to obtain the sintering and crystallization thereof.

6. A glass-ceramic article in accordance with claim 5 wherein the oxide composition includes 1.4–5.6 mole percent total of oxides selected from the group consisting of BaO, PbO, SrO, and CaO.

7. A glass-ceramic article in accordance with claim 5 wherein the article having the nonporous sintered cordierite coating is a lithium aluminosilicate glass-ceramic article.

8. A glass-ceramic article in accordance with claim 7 wherein the coating has an oxide composition which includes at least about 1.4 mole percent total of oxides selected from the group consisting of BaO and PbO.

9. A glass-ceramic article in accordance with claim 8 wherein the article having the nonporous sintered cordierite coating is a lithium aluminosilicate glass-ceramic article which comprises a beta-spodumene solid solution as the principal crystal phase.

10. A glass-ceramic article in accordance with claim 9 wherein the cordierite coating has an average linear coefficient of thermal expansion not exceeding about $20 \times 10^{-7}$/°C. over the temperature range 25°–1000°C.

* * * * *

UNITED STATES PATENT AND TRADEMARK OFFICE
CERTIFICATE OF CORRECTION

PATENT NO. : 4,015,048
DATED : March 29, 1977
INVENTOR(S) : Francis W. Martin

It is certified that error appears in the above—identified patent and that said Letters Patent are hereby corrected as shown below:

Column 6, Table 1A, line 20, Example 6, delete "2.0".

Column 6, Table 1A, line 20, Example 7, after "2.9" insert -- 2.0 --.

Signed and Sealed this fifth Day of July 1977

[SEAL]

Attest:

RUTH C. MASON
*Attesting Officer*

C. MARSHALL DANN
*Commissioner of Patents and Trademarks*